United States Patent [19]
Reimers et al.

[11] Patent Number: 5,899,284
[45] Date of Patent: May 4, 1999

[54] POWERED CART FOR GOLF BAG

[75] Inventors: Eric W. Reimers, Missoula; Franklyn R. Jones, Kalispell, both of Mont.

[73] Assignee: Sun Mountain Sports, Inc., Missoula, Mont.

[21] Appl. No.: 08/780,789

[22] Filed: Jan. 9, 1997

Related U.S. Application Data

[63] Continuation-in-part of application No. 08/378,662, Jan. 26, 1995, Pat. No. 5,749,424.

[51] Int. Cl.[6] ................................................. B62D 51/04
[52] U.S. Cl. ........................ 180/11; 180/19.2; 180/210; 280/DIG. 5; 280/DIG. 6
[58] Field of Search ........................... 180/11, 19.2, 19.1, 180/12, 13, 167, 210, 65.1, 65.5, 208; 280/DIG. 5, DIG. 6

[56] References Cited

U.S. PATENT DOCUMENTS

| | | | |
|---|---|---|---|
| 3,059,713 | 10/1962 | Beggs | 180/19.2 |
| 3,087,562 | 4/1963 | Harks | 280/DIG. 6 |
| 3,334,910 | 8/1967 | Wilson et al. | 280/DIG. 6 |
| 5,232,065 | 8/1993 | Cotton | 180/11 |
| 5,582,419 | 12/1996 | Lucia et al. | 280/42 |
| 5,749,424 | 5/1998 | Reimaers | 180/19.2 |

*Primary Examiner*—Anne Marie Boehler
*Attorney, Agent, or Firm*—Michael J. Hughes; Raymond E. Roberts

[57] ABSTRACT

A powered golf bag cart (10) including a frame assembly (20), a free wheel assembly (22), a drive wheel assembly (24), a power delivery assembly (26), a steering assembly (28), and a control assembly (30). For compact storage, the frame assembly (20) of the cart (10) has nestably collapsible base portion (32), central portion (34), and handle portion (36). The power delivery assembly (26) includes a drive motor (128) and a power train assembly (138) for rotatably motivating the drive wheel assembly (24). In this manner all control and motive force is applied via a single ground contacting surface in the drive wheel assembly (24). The free wheel assembly (22) includes a pair of parallelogram positioners (70) which permit a left front wheel (72) and a right front wheel (74) to be selectably collapsed inward against the frame assembly (20), for even more compact storage, yet to be orientationally motivated by the steering assembly (28) under control of a user operating the control assembly (30) to steer the cart (10) during use.

13 Claims, 9 Drawing Sheets

5,899,284

POWERED CART FOR GOLF BAG

CROSS-REFERENCE TO RELATED APPLICATION

This is a continuation-in-part of application Ser. No. 08/378,662 filed 26 Jan. 1995, now U.S. Pat. No. 5,749,424 titled "POWERED CART FOR GOLF BAG," by inventor Eric W. REIMERS.

TECHNICAL FIELD

This invention relates generally to golfing equipment, and more particularly to powered carts for transporting golf bags.

BACKGROUND ART

One of the drawbacks to the game of golf is the rather large amount of equipment that is required to play, at least by "modem" standards. At a minimum, a game of golf requires the player to transport a number of different clubs across the course. While many players have the physical endurance to carry a bag from hole to hole, particularly long courses can be taxing. In addition, some players may be either unable or unwilling to carry their clubs over long distances.

Caddies, manually pulled carts and automobile-like driven golf carts can relieve the club carrying burden of a player. However, caddies are both expensive and anachronistic and pull carts have proven at times to be almost as much work as carrying the equipment. Standard "golf carts" which carry the player as well as the equipment may not be available at all times on all courses. Further, this type of personnel cart is often limited by course regulations to paved cart paths, frequently inconveniently located with respect to the player's ball, thus resulting in improper club selection. These factors have led to the creation of golf bag carts.

Golf bag carts are mobile structures designed to transport a golf bag laden with clubs. They come in a variety of designs including hand powered carts and motor powered carts. Hand powered carts are typically hand pulled or hand pushed. Motor powered carts typically involve powering one or more bag cart wheels by a motor.

There has been no shortage of efforts to provide the ideal powered golf bag cart. A large number of such efforts have been reflected in issued United States Patents. Many of these are minor variants from the conventional pull car, while others are radical departures in appearance and motive means. All are intended to allow the golfer to transport the clubs and peripheral equipment to the vicinity of the ball easily, while retaining the benefits of walking.

Those which resemble conventional pull carts include: U.S. Pat. No. 3,867,993, issued to Iizuka; U.S. Pat. No. 3,719,247 and U.S. Pat. No. 3,753,473, both issued to Hollis; U.S. Pat. No. 3,893,532 issued to Perlowin; U.S. Pat. No. 3,907,056, issued to Thomas, III; U.S. Pat. No. 3,948,332, issued to Tyner; U.S. Pat. No. 3,952,821, issued to Craven; U.S. Pat. No. 4,106,583, issued to Nemeth; and U.S. Pat. No. 4,657,100, issued to Lewis. All of these include a conventional appearing spindly cart, with motor adaptations to provide the wheels with driving power.

Several patents which represent carts which are different in appearance and structure from the traditional pull cart include: U.S. Pat. No. 3,871,464, issued to Eden; U.S. Pat. No. 3,896,893, issued to Willis; U.S. Pat. No. 4,063,612, issued to Weiss; U.S. Pat. No. 4,570,732, issued to Oaks; and U.S. Pat. No. 5,180,023, issued to the present inventor, Reimers. These present different approaches to achieving the same goals, each with some success.

However, all of the prior art suffers from one or more of the following disadvantages: (1) the device is too heavy; (2) the device is too bulky; (3) the device does not have an adjustable height handle; (4) the device is not easily collapsible; (5) the device does not have a steering offset correction; (6) the device lacks stability when used; (7) the device cannot be remotely controlled. None of the prior art effectively provides a golf bag carrier design which successfully addresses all the above mentioned concerns.

SUMMARY OF THE INVENTION

Accordingly, it is an object of the present invention to provide a compact golf bag cart which is easily storable and transportable, yet strong and stable in use;

It is another object of the present invention to provide a lightweight golf bag cart which is durable;

It is yet another object of the present invention to provide a golf bag cart with a manual operation handle which has an adjustable effective height to conform to the stature and comfort of the user;

It is a further object of the present invention to provide a single wheel drive mechanism for consistency of control and avoidance of power-balancing difficulties;

It is another object of the present invention to provide a collapsible golf bag cart that is easily collapsed and expanded for rapid adaptation for use and storage, and which has a small footprint for storage;

It is a still further object of the invention to provide a single rear wheel drive structure for stability and ease of use, even in the event of power or mechanism failure;

It is another object of the present invention to provide a golf bag cart that is stable over a variety of types of terrain;

It is still another object to provide a power and control structure with a minimum amount of exposed wiring, and with essentially no wiring which requires bending and folding during the transition to or from the storage mode to the use mode; and It is yet another object of the present invention to provide a golf bag cart that can be controlled easily by remote control, or manually from the handle.

Briefly, the preferred embodiment of the present invention is a collapsible, golf bag cart that is powered by an electric motor. The preferred embodiment includes a collapsible frame for supporting the golf bag and the cart mechanisms, a pair of opposed free spinning front wheel assemblies, a drive wheel assembly, a power delivery assembly, a steering assembly, and a user operated control assembly.

The collapsible frame includes a handle portion and a central portion which together fold adjacent to a base portion. The base portion is supported above the ground at the front by a free wheel assembly including a left wheel and a right wheel, and at the rear by a drive wheel assembly. Both the left and right front wheels are mounted on cantilevers which allow the wheels to pivot away from the base portion on a lockable left and right parallelogram positioners, respectively. The front wheels are rotatably mounted on axles which include axle arms which are in turn controlled by the steering assembly. The drive wheel assembly includes a rear wheel mounted on a fork arm that extends in a downward direction from the base portion, which is driven by a motor unit also mounted on the base member.

A control assembly enables the golfer to control the steering action and the speed of the drive motor and includes interchangeable remote controller units adapted to be carried separately, and receiver means incorporated into control electronics, for controlling the drive motor and steering assemblies in response to operator input. In the preferred structure, there is no hard wiring between the controller unit and the receiver subassembly.

An advantage of the present invention is that is provides a golf bag cart that is easily collapsible for compact storage, while being large and strong enough to support cumbersome and heavy golf bags and to retain stability in use on variable golf course terrain.

Another advantage of the invention is that it provides stable, self-centering, self-correcting and easily controlled steering.

A further advantage of the present invention is that it provides a golf bag cart which maintains good balance characteristics on a wide variety of terrain conditions, while being light enough for the average golfer to easily handle manually, if needed.

Yet another advantage of the invention is that it provides a powered cart that may be successfully utilized in unpowered mode, if made necessary by power or mechanical failure.

A still further advantage of the golf bag cart of the present invention is that it has dynamic braking capability to aid in preventing runaways on steep inclines, as well as a set limited mechanical resistance to slow the golf bag cart under power failure conditions.

Another advantage of the invention is that the power source (battery) is easily removable for handling and recharging, thus separating the weight into component parts so that the user need not lift the combined weight at once.

Yet another advantage is that the frame member is adapted to absorb and minimize shock to equipment, while also minimizing degradable components.

Still another advantage is that the component parts, both mechanical and electronic, of the golf bag cart are modular so that they may be easily replaced and interchanged, thus minimizing downtime.

Still another advantage of the invention is that the controller units provide ease of use, interchangeability and range, while minimizing wiring which would interfere with collapsibility and be subject to stress failures.

Still another advantage of the present invention is that a myriad of electronic features, including tethered auto-shutoff, steering and motor ramped power delay, and motor overload kickout provide user-transparent safeguards against breakdown and malfunction related incidents.

A still further advantage of the present invention is that a myriad of the electronic features, including visible transmitter command entry feedback, visual cart activity indication, visible power level status indication and other diagnostic features are provided.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWING

FIG. 6 is a cross sectional view of the left outer wheel lock taken along section 1—1 of FIG. 5a;

BEST MODE OF CARRYING OUT THE INVENTION

Figure 1:
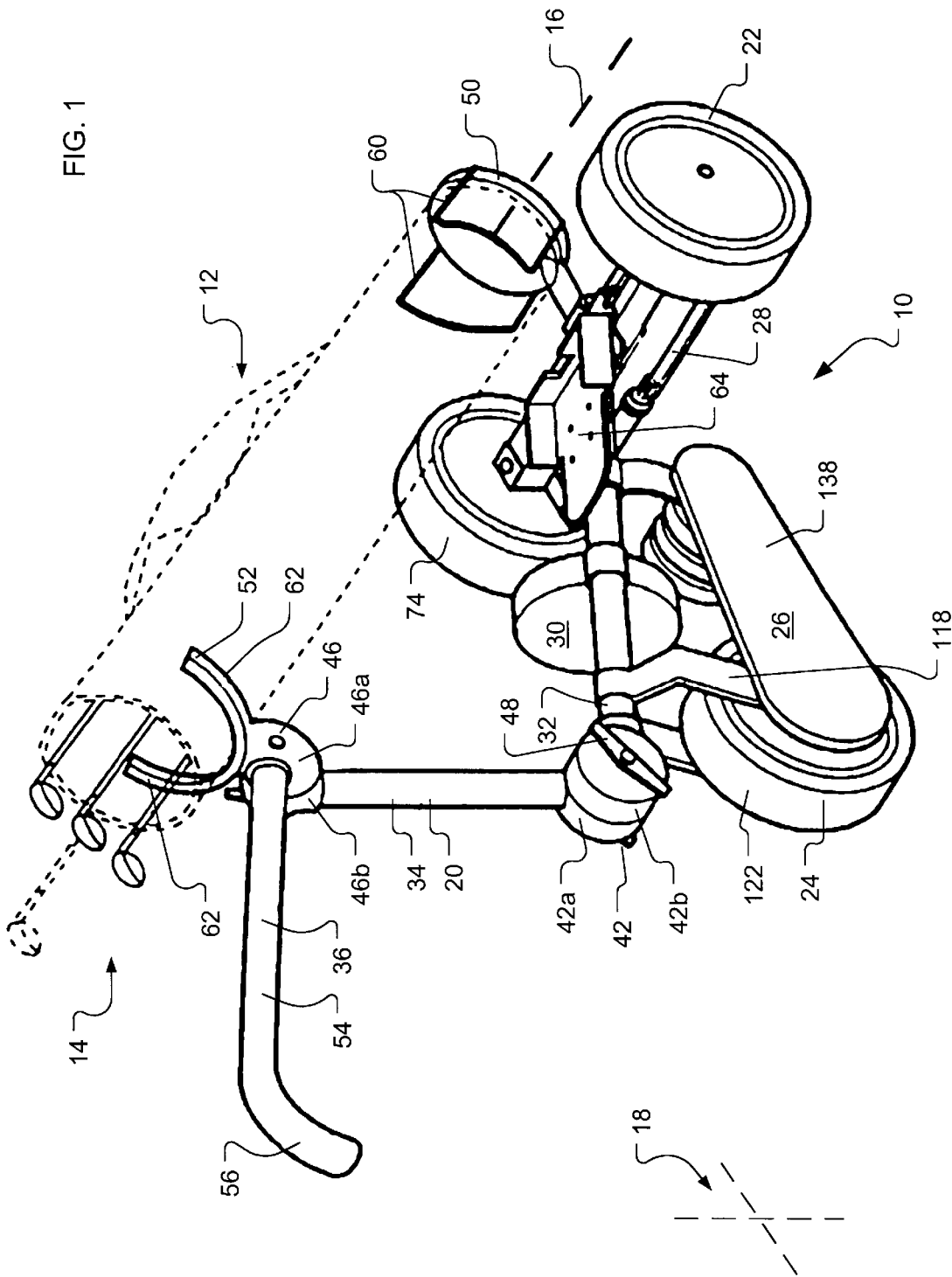
FIG. 1 is a perspective view of the preferred embodiment in the use mode.

The best presently known mode for carrying out the invention is an electrically powered golf bag cart for transporting a golf bag. The powered cart for a golf bag is designed to be extendible into an operational configuration ("use" mode) and to collapse into a compact structure ("store" mode) that is easy to store and transport. The golf bag cart is electronically controlled by the user, either from the immediate vicinity of the cart or from a slightly remote location (limited to 60 to 100 yards, as a safety feature). The present invention is intended for use by those who wish to walk on a round of golf, while avoiding the strain of carrying or pulling the golf bag and equipment.

The preferred embodiment of the present invention is a collapsible powered cart for a golf bag which is illustrated in the several figures of the drawing and designated throughout by the general reference character 10. As is shown in the perspective view of FIG. 1, the cart 10 is adapted to support any of a variety of conventional golf bags 12 thereon. A typical generalized golf bag 12 is shown in phantom in FIG. 1. Ordinarily, the golf bag 12 will contain a plurality of golf clubs 14 (also shown in phantom) and additional paraphernalia not shown, such as balls, tees, a towel and the like, all of which provide mass which the golfer would ordinarily carry or pull as the golfer walks on a golf round. The golf bag 12 is an elongated structure which is generally disposed about a longitudinal bag axis 16. The bag axis 16 is maintained so as to be offset from vertical with respect to the ground surface during usage in order to facilitate club presentation, insertion and removal.

Figure 2:
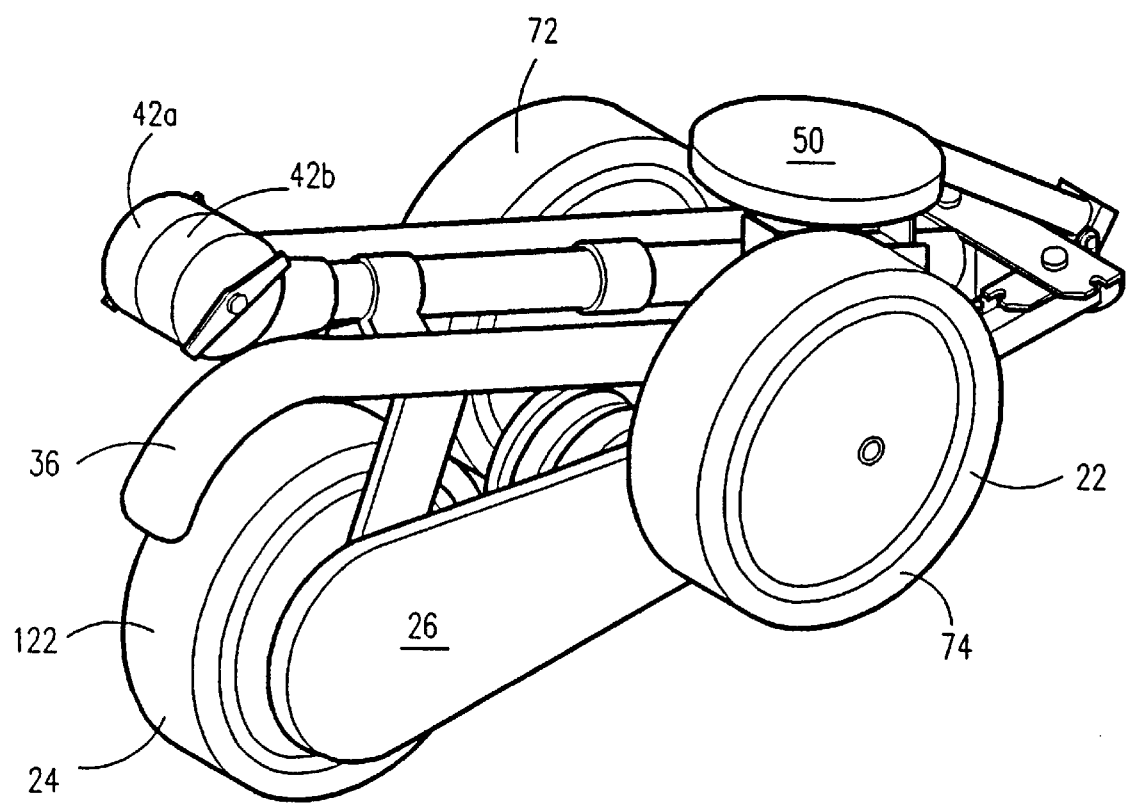
FIG. 2 is a perspective view of the preferred embodiment in the store mode.
Figure 3:
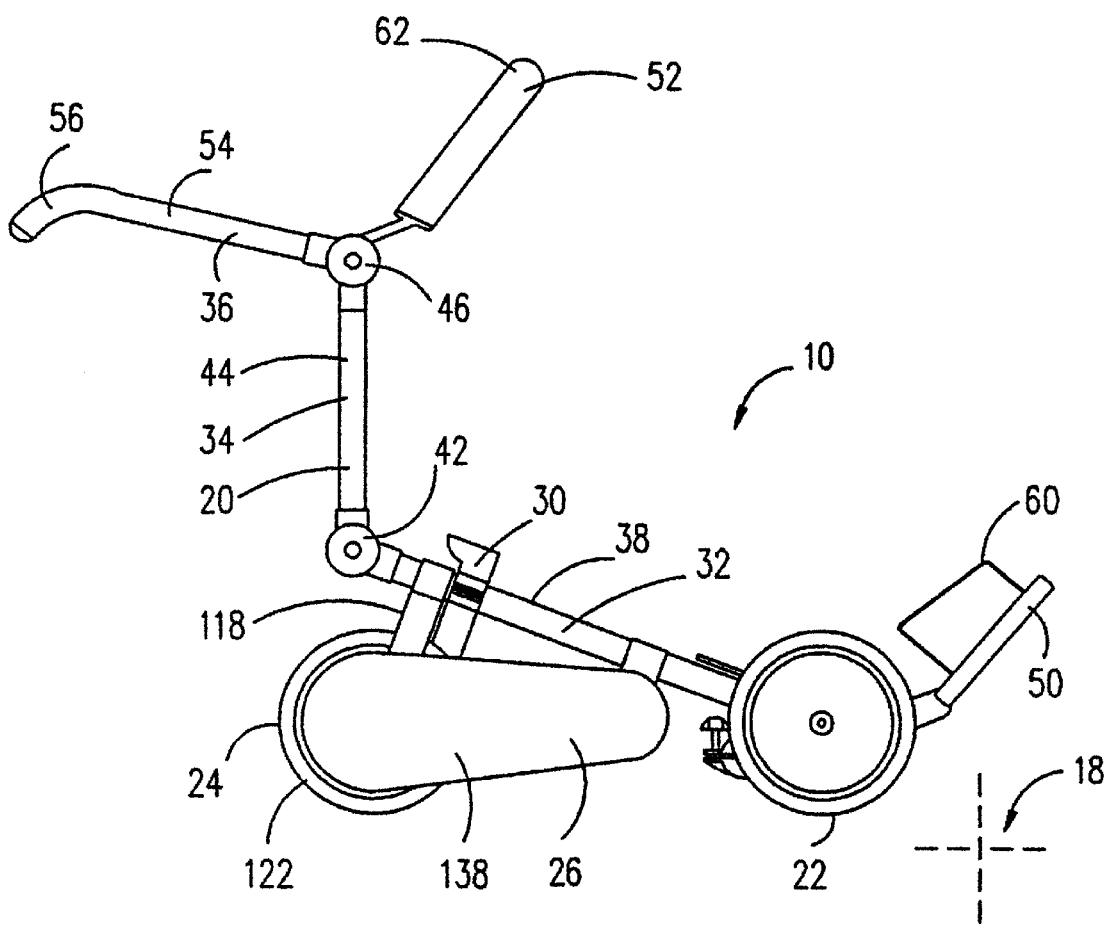
FIG. 3 is a right side elevational view of the preferred embodiment in the use mode.
Figure 4:
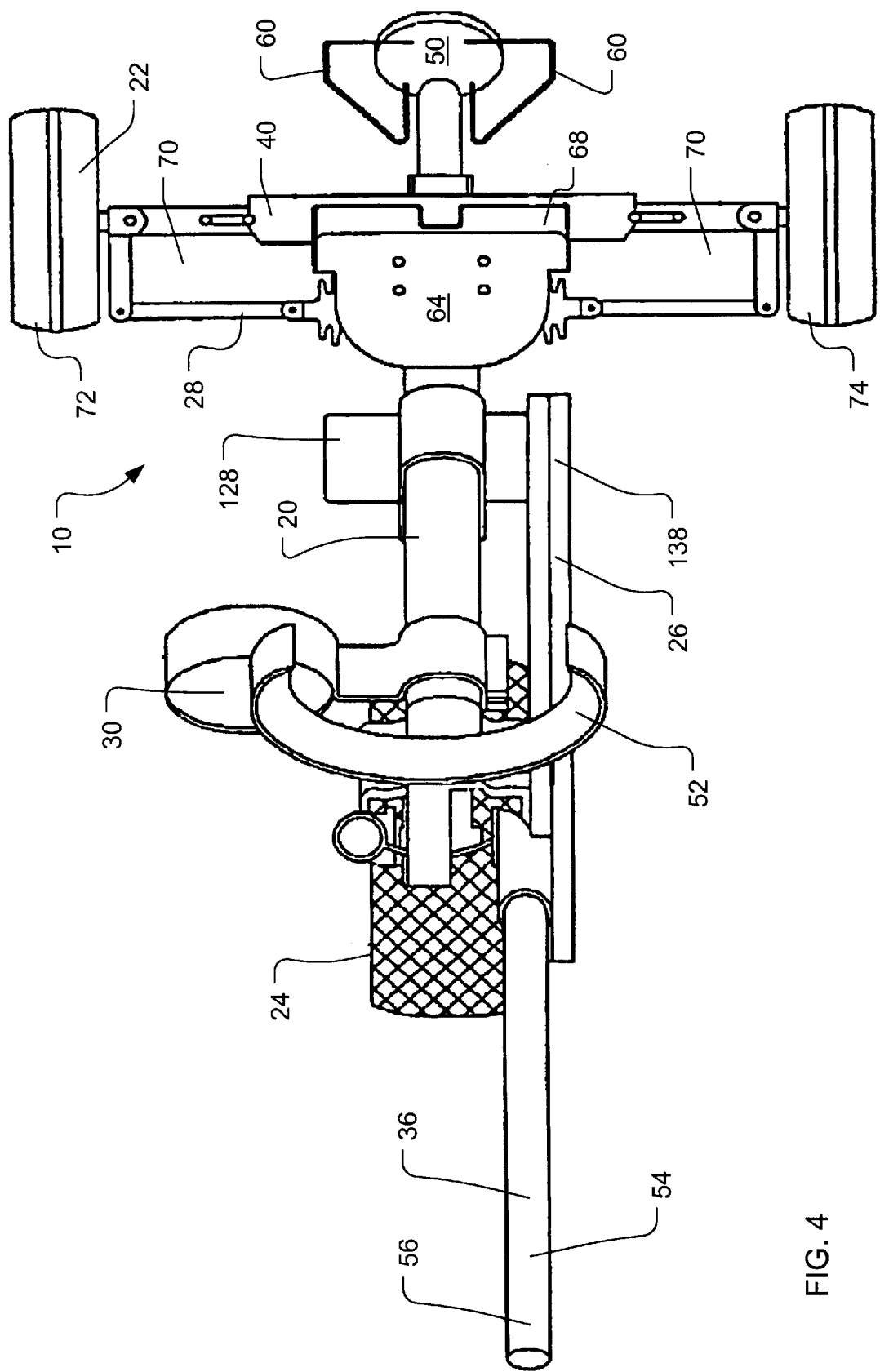
FIG. 4 is a top plan view of the preferred embodiment in the use mode.

As illustrated in the perspective view of FIG. 1 and the side elevational and plan views of FIGS. 3 and 4, the cart 10 is shown as having been extended into a use mode, for support of the golf bag 12 and for actual use on the course. The perspective view of FIG. 2, on the other hand, illustrates a store mode of the cart 10, wherein it is collapsed for storage or transport, as in the trunk of a vehicle. In the store mode the cart 10 is characterized by a compact footprint and volume, but is not adapted to support a golf bag 12. Therefore, it is intended that the golf bag 12 be removed prior to conversion from use to store mode.

The cart 10 is constructed to be generally symmetrical about a longitudinal (vertical) bisecting plane 18. In the use mode (FIG. 1) the bisecting plane 18 will also be aligned with the bag axis 16, provided that the golf bag 12 is properly mounted.

The cart 10 is a unitary construction but may be considered as a combination of several assemblies. The primary functional and structural assemblies of the cart 10 are: a frame assembly 20 (illustrated particularly in FIGS. 1, 3, and 4); a free wheel assembly 22 (illustrated primarily in FIGS. 1, 4, and 5a–c); a drive wheel assembly 24 (illustrated primarily in FIGS. 1 and 3); a power delivery assembly 26 (shown especially in FIGS. 1, and 5); a steering assembly 28 (shown especially and FIGS. 5a–c), and a control assembly 30 (illustrated primarily in FIGS. 8, 9, and 10).

It should be noted that the present cart 10 is defined herein as having a front, which is the direction in which it travels under power. The free wheel assembly 22 is located in the front, and it follows that the drive wheel assembly 24 is located at the rear. Further, since a user will usually be at the rear of the cart 10, following it during travel or for removing and replacing golf clubs 14 at the golf bag 12, left and right sides are defined based upon such a user's perspective, i.e., looking forward from the rear.

FRAME ASSEMBLY

Referring now particularly to FIGS. 1, 2, 3, and 4, the frame assembly 20 is shown to be formed of a variety of interconnected members, providing the structural integrity for the cart 10 as well as the immediate support for the golf bag 12. The frame assembly 20 is supported off the ground at the front by the free wheel assembly 22 and at the rear by the drive wheel assembly 24. The frame assembly 20 has three primary portions, hingedly connected for collapsibility. These are a base portion 32, a central portion 34, and a handle portion 36. When in conventional "upright" position, in both the use and store modes, the base portion 32 slopes generally upward towards the rear of the cart 10. In use mode the central portion 34 is typically oriented approximately vertical, but this is user adjustable (as described below). In store mode the central portion 34 is nested into a position immediately adjacent and to the right of and almost parallel to the base portion 32. In use mode the handle portion 36 is extended roughly horizontally, but considerable user adjustment of this is also provided (described below), to accommodate different user heights and preferences. In store mode the handle portion 36 is nested into a position immediately adjacent and to the left of and almost parallel to the base portion 32.

The base portion 32 includes a primary structural member in the form of a base spar tube 38, connected at its front extremity to a base buttress 40 and at its rear extremity to a lower hinge assembly 42. In the preferred embodiment, the base spar tube 38 is straight in shape, and when connected to the base buttress 40 the pair form roughly a "T" shape.

The central portion 34 includes a primary structural member in the form of a central spar tube 44 which has the same general shape as the base spar tube 38.

The central portion 34 is pivotally connected at its extremities to the lower hinge assembly 42 and an upper hinge assembly 46. In use mode the central portion 34 assumes a generally upright position, while in store mode the central spar tube 44 is folded down and nests almost parallel to and adjacent to the base spar tube 38.

The lower hinge assembly 42 includes a first hinge section 42a, which is attached to the rear of the base spar tube 38, and a second hinge section 42b, which is attached to one extremity of the central portion 34 (the rear end in storage mode, and the lower end in use mode). In concert the lower hinge sections (42a and 42b) function in a compressible racketing manner which may be locked into fixed orientation by user operation of a lower adjustment knob 48 to compress them together. In this manner, selective user adjustment may fix the rotational position of the central portion 34 relative to the base portion 32. Such adjustment is also used to facilitate compacting the cart 10 into the store mode. Further, different rotational orientations of the lower hinge assembly 42 may be used to vary the orientation of the base portion 32 and the central portion 34 (which respectively have attached a bag bottom bracket 50 and a bag collar support 52, both described below), to thereby accommodate specialized golf bags 12, although the approximately right angle orientation of FIG. 3 will be adequate for most purposes.

The handle portion 36 includes a handle spar tube 54, having at its rear extremity (the front/rear orientation is the same in both use and storage modes) a grip portion 56 for the user to grasp and manually control the movement of the cart 10, and to manipulate it in the event of power failure. At its front extremity the handle spar tube 54 is connected to the upper hinge assembly 46. Unlike the nominally straight base spar tube 38 and central spar tube 44, the handle spar tube 54 has a slight downward extending curve at its grip portion 56, which facilitates grasp by a user. In store mode the handle spar tube 54 also is folded down and nests almost parallel to and adjacent to the base spar tube 38, but the grip portion 56 wraps over the drive wheel assembly 24, for more compact storage.

The handle portion 36 is pivotally connected to the top (as perceived in use mode) of the central portion 34 at the upper hinge assembly 46. The upper hinge assembly 46 includes a first hinge section 46a, which is attached to the central spar tube 44, and a second hinge section 46b, which is attached to the front end of the handle spar tube 54. In concert, the upper hinge sections (46a and 46b) permit the handle portion 36 to pivot over a large range, yet also function in a compressible racketing lockable manner by user operation of an upper adjustment knob 58. Much in the manner of the lower hinge assembly 42, selective user adjustment here fixes the rotational position of the handle portion 36 relative to the central portion 34. When in use, the typical arrangement is to have the handle portion 36 arrayed roughly perpendicular to the central portion 34, with the approximate upward depending orientation of FIG. 3 adequate for most users. However, different rotational orientations may easily be set to permit adjustment for the height or comfort angle of the user. Further, the range of adjustment here also facilitates compacting the cart 10 into the store mode.

FRAME ASSEMBLY OPTIONS

The bag bottom bracket 50, noted above, is attached to and extendably pivots forward from the base buttress 40, to provide angled bottom support for the golf bag 12. In the preferred embodiment the bag bottom bracket 50 includes bracket arms 60, which in the preferred embodiment are formed of two stout wire loops. The bracket arms 60 extent in a manner which through the action of gravity retains the lower end of the golf bag 12 as it rests in the cart 10.

The bag collar support 52, also noted above, is attached to the frame assembly 20 at the upper hinge assembly 46, and extendably pivots forward for use to provide angled upper support for the golf bag 12. The bag collar support 52 includes two collar arms 62 for supporting and through gravity retaining in place a loaded golf bag 12. In use mode the collar arms 62 extend partially around the lower and side portions near the upper end of the loaded golf bag 12 as it rests in the cart 10. In storage mode the bag collar support 52 pivots forward so that the collar arms 62 partially encompass the collapsed spar tubes (38, 44, and 54), for further storage compactness.

Mounted above the base buttress 40 and the front end of the base spar tube 38 is a battery support bracket 64, upon which a power battery 66 (described further in conjunction with the power delivery assembly 26) is removably mounted. The battery support bracket 64 is generally parallel to the base portion 32, and since the base portion 32 has a slope, the battery support bracket 64 has a similar slope. The battery support bracket 64 includes an upward depending lip 68 at its front and extending partially around both its left and right sides. The slope of the battery support bracket 64 and the lip 68 together provide surface area against which the power battery 66 tends to be held in place by gravity.

FREE WHEEL ASSEMBLY—COLLAPSIBLE PARALLELOGRAM ASSEMBLY

Figure 5A:
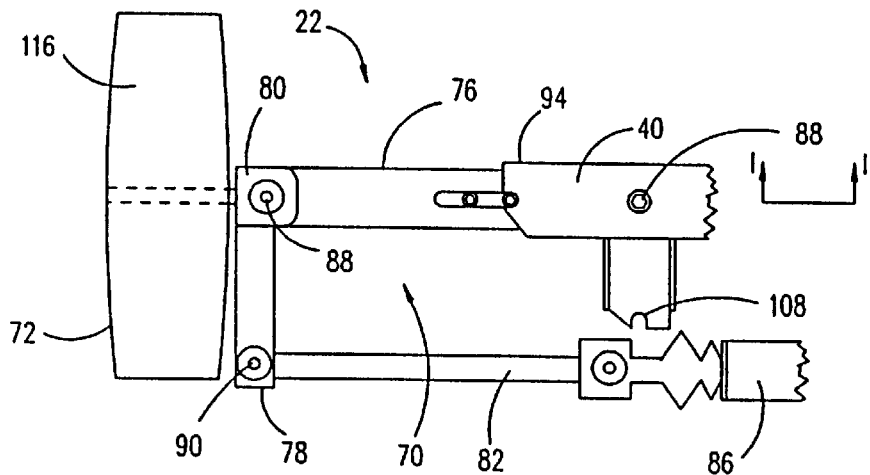
FIG. 5, parts 5a, 5b, and 5c, is a top plan view of the left front free wheel subassembly, shown in use mode and in a partially collapsed orientation and in store mode, respectively.
Figure 5B:
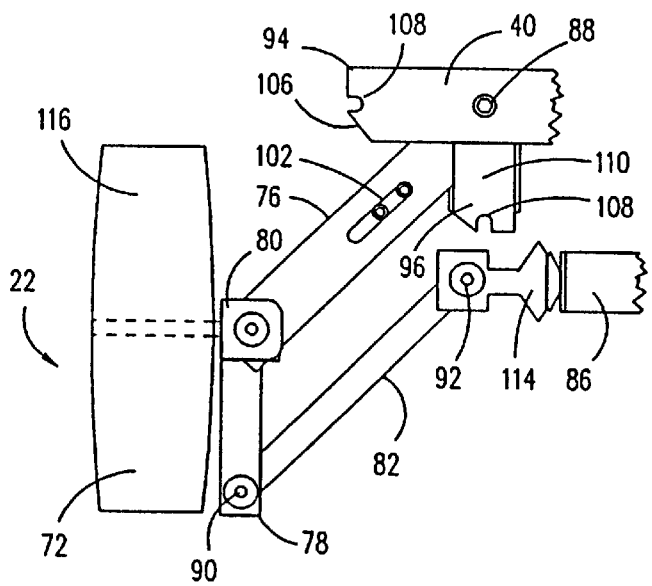
Figure 5C:
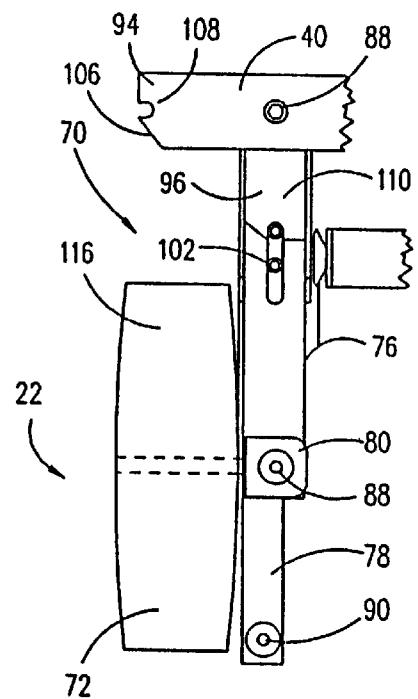
Figure 6:
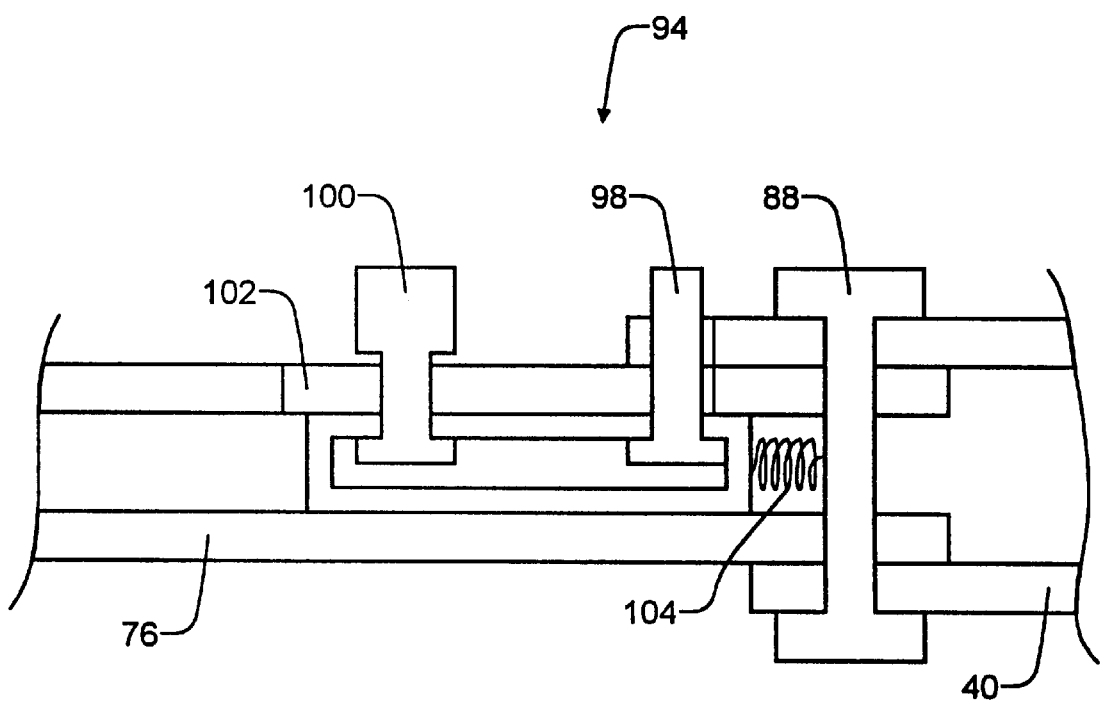

The front free wheel assembly 22 (which is in two mirror image left and right sections; the left of which is particularly illustrated in FIGS. 5a–c) is adapted to collapse and extend so as to dramatically alter the footprint of the cart 10 between the use and store modes. In the use mode of FIGS. 1 and 5a, each of the left and right portions of the free wheel assembly 22 is fully extended to provide a wide footprint and very stable rolling and stationary support for the cart 10, while in the store mode of FIGS. 2 and 5c, the free wheel assembly 22 is retracted to provide a small storage footprint.

The key to the retractability and stability of the free wheel assembly 22 is the offset side parallelogram positioner 70 (see FIGS. 5a–c, particularly), two opposing instances of which are used to connect a left front wheel 72 and right front wheel 74 respectively to the cart 10. The parallelogram positioner 70 provides precise folding, control, and support with minimum structure. It also makes the cart 10 quite robust and crash resistant, maintaining alignment of the front wheels 72 and 74 despite robust use, something notably lacking in many prior art designs.

The parallelogram positioners 70 associated with each of the front wheels are so named because they each operate with parallel motion of a parallelogram defined by an axle tube 76; an axle arm 78, which is a rearward extension of an axle unit 80; a steering rod 82; and the position of a clevis 84 which is part of a steering solenoid 86 (described below) that is somewhat rearward mounted on the base buttress 40. At its proximal end, the axle tube 76 is pivotally connected with an inner instance of an axle pin 88 to a distal end of the base buttress 40, while at its distal end, the axle tube 76 is pivotally connected with an outer instance of an axle pin 88 to the front end of the axle arm 78. At its proximal end, the steering rod 82 is pivotally connected with a clevis pin 92 to the clevis 84 of the steering solenoid 86, while at its distal end, the steering rod 82 is pivotally connected with a steering arm pin 90 to the rear of the axle arm 78. In use mode, the steering rod 82 is disposed rearward of, vertically below, and horizontally parallel to the axle tube 76 (FIGS. 1, 4, and 5a). In store more, i.e., when fully collapsed as in FIGS. 2 and 5c, the steering rod 82 is underneath the axle tube 76.

The axle units 80 respectively have rotatably mounted thereon the left and right front wheels 72 and 74, in a manner which is unencumbered by any rotation restricting or enhancing mechanisms. Overall, the free wheel assembly 22 therefore maintains rigidity in use while also allowing horizontally planar folding of the components under and against the sides of the frame assembly 20 for space saving storage compactness (extension-compaction sequence is depicted in FIGS. 5a–c). The manner in which the parallelogram positioners 70 pivots with respect to the frame and the wheels ensures that the front wheels 72 and 74 are held in an orientation which is parallel in the extended use mode (FIGS. 1, 4, and 5a), in the collapsed store mode (FIGS. 2 and 5c) and in positions intermediate these extremes, such as the partially collapsed orientation of FIG. 5c.

In the preferred embodiment, the left and right front wheels 72 and 74 are constructed with the primary considerations of strength, durability and minimal weight being paramount. However, the front wheels 72 and 74, and the method of their mounting upon the axle units 80, may be entirely conventional, and accordingly will not be discussed here.

To maintain the overall relationship of each parallelogram positioner 70 an outer wheel lock 94 is provided to prevent unintended collapsing when in use mode, and an inner wheel lock 96 is similarly provided to prevent unintended opening when in store mode (FIGS. 5a–c and 6). The wheel locks 94 and 96 of the cart 10 are in the form of a pin-notch engaging mechanism. A locking pin 98 is provided having an upward extended head 100 suitable for the user to grasp with the fingers. The locking pin 98 is slidably contained within a pin slot 102 provided in the axle tube 76, and is connected to the distal end of a spring 104 (shown only in FIG. 6) which is contained within the axle tube 76. The opposite (i.e., proximal) end of the spring 104 is connected to the inner instance of the axle pin 88. In this manner the locking pin 98 is normally slidably urged under tension from the spring 104 toward the proximal end of the pin slot 102 (e.g., the condition of the locking pin 98 in FIG. 5b).

The distal end of the base buttress 40 is suitably shaped to provide a strike edge 106 (which functions somewhat similar to a strike plate in conventional lock mechanisms) and an adjacent lock notch 108. As a parallelogram positioner 70 is extended, the locking pin 98 engages with and rides against the strike edge 106; then, at full extension, the locking pin 98 encounters the lock notch 108 and under tension from the spring 104 is urged into and held in the lock notch 108, thus locking the parallelogram positioner 70 in an extended position for use (FIG. 5a). For the locking pin 98 to escape from the lock notch 108 the user merely has to grasp the extended head 100 of the locking pin 98 and pull the locking pin 98 outward, overcoming the tension of the spring 104.

The base buttress 40 is further provided with an inner lock arm 110, which also has a strike edge 106 and a lock notch 108. In similar manner to extending and locking open, the parallelogram positioner 70 can be collapsed for storage and locked closed (FIG. 5c) in a manner which also requires user intervention to overcome. This feature is useful for maintaining compactness of the cart 10 in the store mode.

STEERING ASSEMBLY

The steering assembly 28 of the cart 10 is best illustrated in FIGS. 4 and 5a–c. The steering assembly 28 operates at the front of the cart 10 on the front wheels (72 and 74) directly, thus obviating any need for the drive wheel assembly 24 to have a turning capability.

The preferred steering assembly 28 includes an anchor bracket 112 which is either an integral part of, or is firmly attached to the base buttress 40 of the frame assembly 20. Mounted on the anchor bracket 112 is a steering solenoid 86, which includes a solenoid shaft 114. The solenoid shaft 114 is positioned axially within the steering solenoid 86 in such a manner that it may be axially displaced either left or right in response to appropriate electrical activation. The solenoid shaft 114 is a rigid straight structure which terminates at its left and right extremities with a clevis 84, to which the proximal ends of the steering rods 82 (described above) are each attached with a clevis pin 92.

The steering solenoid 86 is activated by the control assembly 30 to push the solenoid shaft 114 alternate left or right directions, and in turn transfer motion through the steering rods 82 into the axle arms 78 (parts of the axle units 80, upon which the front wheels 72 and 74 are mounted). This motion transfer causes the parallelograms defined in the parallelogram positioners 70 to lozenge and the relationship of the front wheels 72 and 74 relative to the vertical bisecting plane 18 to change. If the solenoid shaft 114 is pushed rightward out of the steering solenoid 86 when moving forward, the cart 10 turns to the left. Conversely, if the solenoid shaft 114 is pushed leftward out of the steering solenoid 86 when moving forward, the cart 10 turns to the right. Electronic circuitry can also be applied to this type of solenoid-based steering to provide self correction and automatic centering.

DRIVE WHEEL AND POWER DELIVERY ASSEMBLIES

The drive wheel assembly 24 is primarily illustrated in FIGS. 1, 2, and 3. It is situated at the rear of the cart 10, and with the power delivery assembly 26 provides the driving force to propel the cart 10. The drive wheel assembly 24 includes a fork arm 118 attached at its top to the base spar tube 38 of the frame assembly 20. On the lower end of the fork arm 118 is rotatably mounted a drive wheel 122. The mechanism for rotation for the drive wheel 122 may be entirely conventional, and since the arts used for affixing wheels upon axles and facilitating their rotation are all well known, such will not be discussed here. In principal, the drive wheel assembly 24 functions rather like the rear fork and wheel assembly of a conventional bicycle, however with the components of the present invention having much different dimensions than those typical in bicycles.

The motive force for turning the drive wheel 122 is provided by the power delivery assembly 26, mounted on and below the base spar tube 38, and which includes a horizontally oriented drive motor 128 and a power train unit 138. The power train unit 138 is attached at its front to right face of the drive motor 128 and at its rear to the right tine of the fork arm 118.

The components of the power delivery assembly 26 may be largely conventional and of off-the-shelf type components. The preferred drive motor 128 is a DC electric unit, suitable for dynamic breaking duty to prevent cart 10 runaway, and also having RF noise filtering so that operation of the control assembly 30 is not interfered with.

The preferred power train unit 138 is a two stage assembly of sprockets and chains having a 0.25 pitch at the first stage and a 0.5 pitch at the second. Presently the inventor uses aluminum for the first stage sprockets and plastic for the second stage, with plastic covered cable-chain from W.M. Berg company of Rockway, N.Y.

In combination the drive motor 128 and the power train unit 138 provide a set amount of mechanical resistance, to prevent cart 10 runaway even in power loss situations. Of course, other power delivery systems, components, and mounting arrangements can be used in the power delivery system of the cart 10. A few examples include gear train systems, toothed belt systems, and direct drive motor armature wheel systems.

Power for the drive wheel assembly 24 and the steering assembly 28 is obtained from the power battery 66, under direction of the control assembly 30. The power battery 66 is easily removable. This makes exchange of power batteries 66 easy, and permits separate recharging of discharged units while the cart 10 is in use elsewhere. Further, it is intended that the power battery 66 be removed from the cart 10 prior to compacting into storage mode, to reduce the weight of the cart 10 and to permit it to be reduced into a smaller volume.

CONTROL ASSEMBLY

The control assembly 30 includes a control box 154, some electrical wiring 152, and the remote controller 150. The control box 154 is illustrated in a elevational rear face view in FIG. 7, the remote controller 150 is shown in a top plan view in FIG. 8, and both are shown in generalized block diagram form in FIG. 9.

Figure 7:
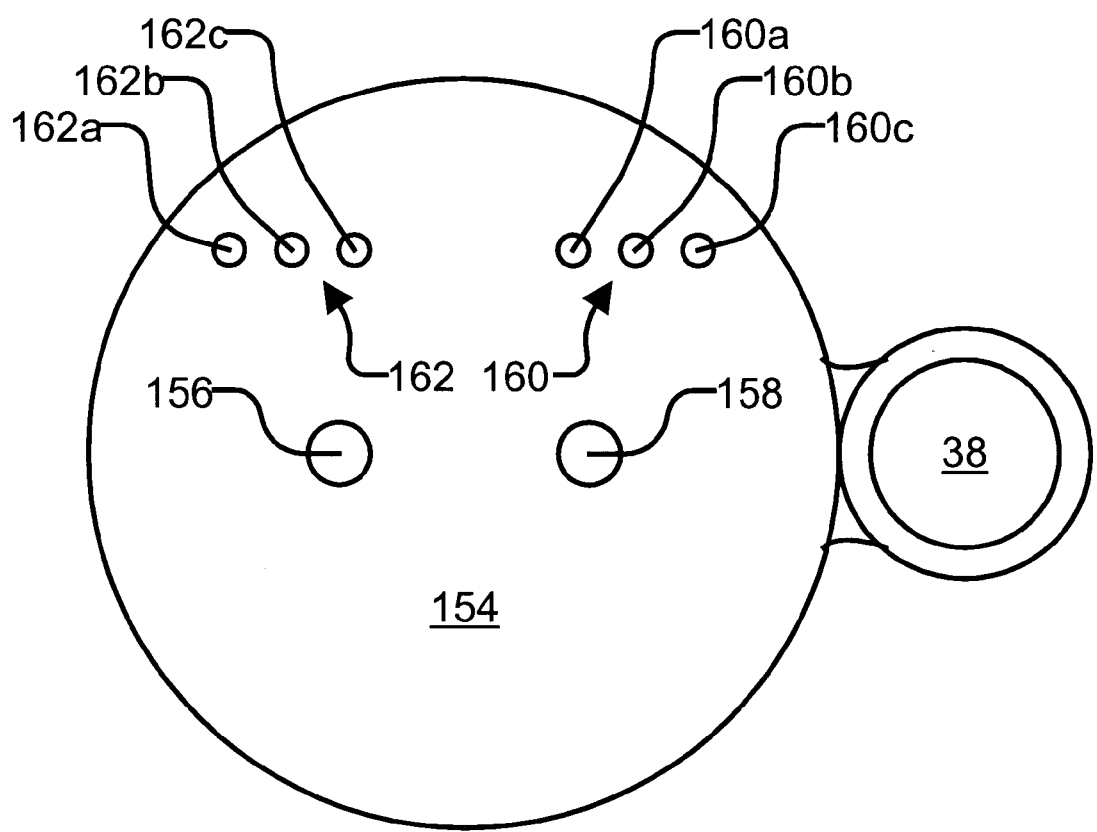
FIG. 7 is a rear elevational view of the control box portion of the invention.

The control box 154 is a receptacle for the circuitry which is utilized to operate the invention, and is designed to be a simple structure mounted on the exterior of the cart 10, since the user adjustable components of the invention are intentionally very limited. As shown in FIG. 7, the surface of the control box 154 includes an on switch 156, an off switch 158, a battery level indicator 160, and an activity indicator 162.

In the preferred embodiment the on switch 156 and the off switch 158 are momentary contact units which activate and deactivate the power from the power battery 66 to the rest of the cart 10 in a latching manner. This provides a safety feature, as well as providing an easy reset capability, useful say for when the cart has run into something and the drive motor 128 has kicked off due to an overload.

The preferred battery level indicator 160 consists of an array of three light emitting diodes (LED). From Left to right, these are a green power LED 160*a*, a yellow power LED 160*b*, and a red power LED 160*c*. Green signifies that the charge level of the power battery 66 is OK. Yellow signifies that the charge level is marginal, i.e., that the cart 10 needs to be taken in promptly so to recharge or swap the power battery 66. And, red signifies that the charge level is unacceptably low (e.g., that lack of charge may be a reason why the cart 10 is not performing up to expectations, or performing at all). Whenever power to the control box 154 is on (i.e., "latched" on by actuation of the on switch 156), one of these power LEDs (160*a*, 160*b*, 160*c*) should be lit, thus providing a useful diagnostic feature.

The preferred activity indicator 162 is also an array of three LEDs, however all of these are red and it is their respective position and varying illumination state which provide information. A left LED 162*a* lights when the control box 154 is activating the steering solenoid 86 to turn left. A center LED 162*b* lights when the drive motor 128 is being activated. And a right LED 162*c* lights when the control box 154 is activating the steering solenoid 86 to turn right. A key use of these activity LEDs (162*a*, 162*b*, 162*c*) is for diagnostic purposes.

The control assembly 30 is adapted to utilize a minimal amount of wiring 152 and to limit that to portions of the cart 10 which are not subject to stress during the folding and unfolding processes. For this reason, control communications are exclusively via radio channel. No wiring is provided to the remote controller 150 or to any portion of the structure other than those attached to the base portion 32. A wiring aperture 164 is provided to permit the various necessary wiring 152 to access the components within the control box 154. The necessary wiring 152 extends from the power battery 66 to the control box 154, and from the control box 154 to the drive motor 128 and the steering solenoid 86.

All of this remains in relatively constant position in all orientations and modes of the device, thus virtually eliminating possible damage to the wiring 152 from repeditive flexing.

Figure 8:
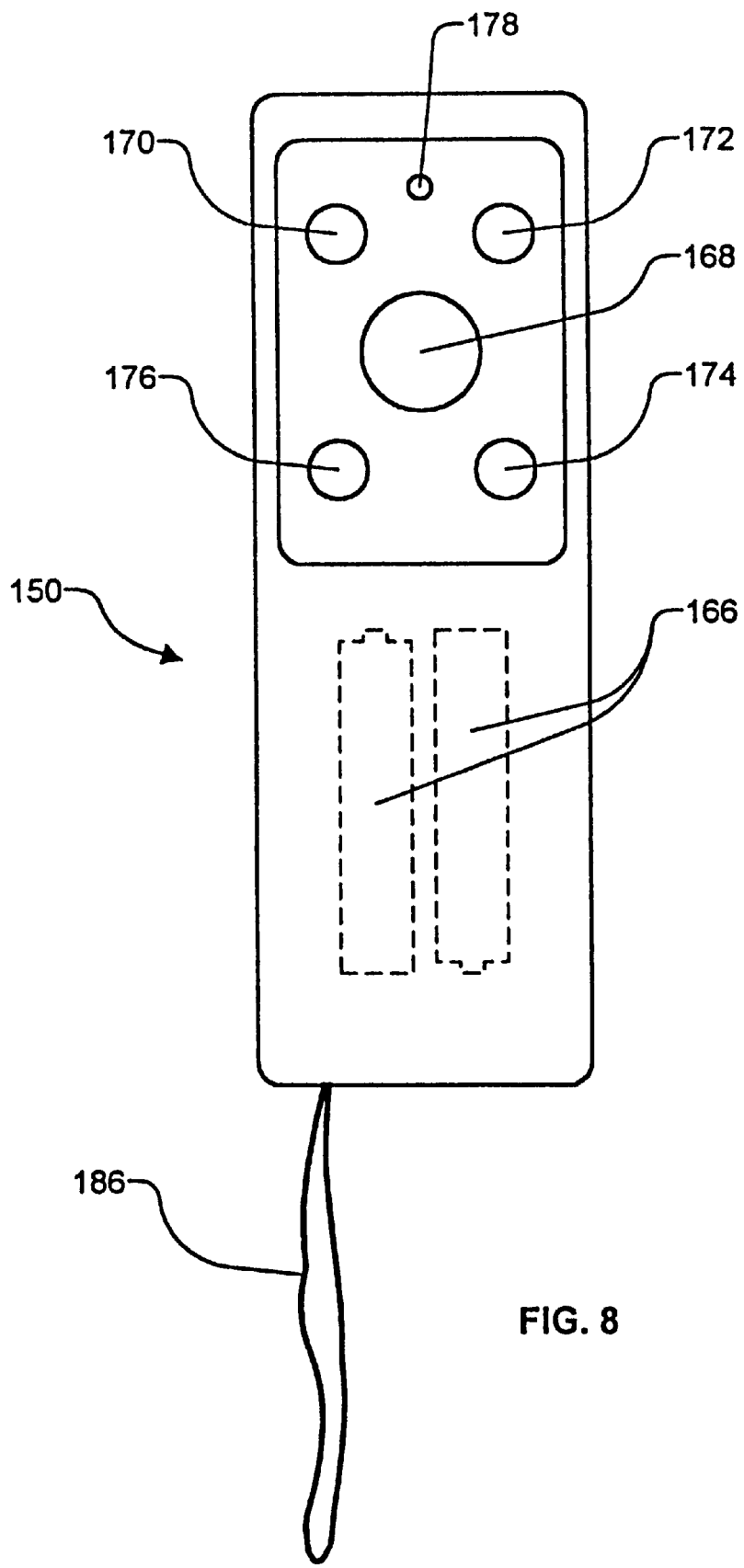
FIG. 8 is a top plan view of a handheld controller unit.

The remote controller 150 is illustrated in a top view in FIG. 8. The remote controller 150 is adapted to be carried by the golfer when the golfer is physically away from the cart 10. In keeping with the principle of simplicity of operation, a limited number of control options are provided to the golfer on the remote controller 150. It has been found that the few controls required are a stop/start button 168, a left turn button 170, and a right turn button 172. However, since it is desirable to have more than one speed of movement available, a fast button 174 and a slow button 176 are also provided. Further, a transmit LED 178 is provided to give user feedback. These are illustrated in a generalized fashion in FIG. 8 and it is envisioned that the actual appearance of the remote controller 150 may differ substantially from that shown. Additional, or different control options are also envisioned.

Figure 9:
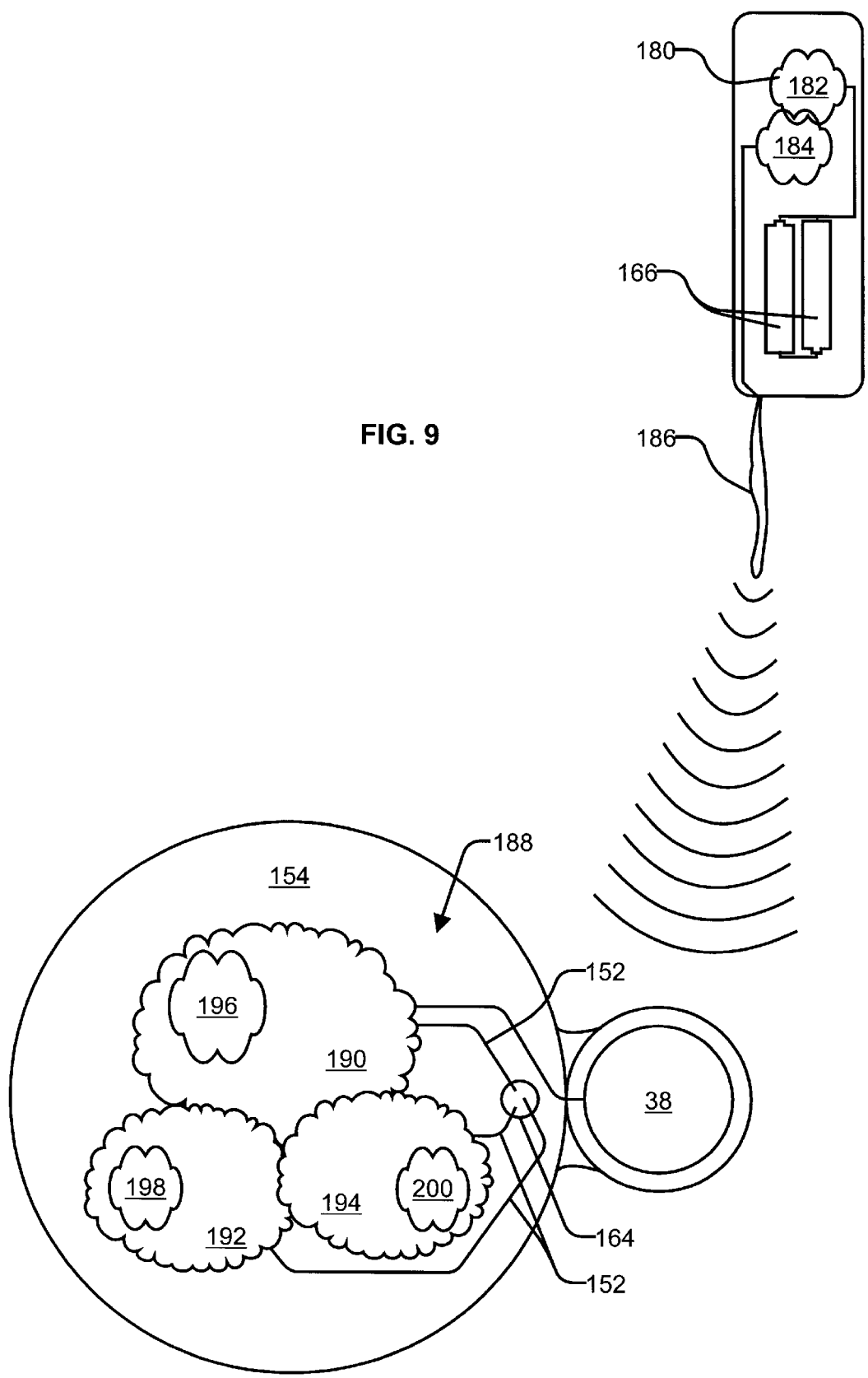
FIG. 9 is a generalized block diagram of the circuitry associated with the control and power delivery assemblies.

FIG. 9 represents a block diagram schematic of the control logic utilized with the invention. It should be understood that this is a rough presentation with the components defined by function. It also should be understood that those skilled in the art would have no difficulty in devising any of a number of specific structures able to accomplish the general purposes involved.

In order to operate properly, the remote controller 150 is provided with circuitry 180, contained in the interior of the unit. The circuitry 180 includes interpreter logic 182 and transmitter logic 184. The interpreter logic 182 receives input from depression of any of the buttons on the remote controller 150 and interprets such input in order to instruct the transmitter logic 184 as to the nature of radio signals to transmit for reception by the control box 154. The remote controller 150 is powered by battery cells 166, shown in phantom in FIG. 7 (four AAA cells are used). A key feature of the transmitter logic 184 is that, once activated with the stop/start button 168, a tag or tether type transmission is sent every eighth of a second and regular command transmissions are made effectively immediately. This provides very efficient usage of the charge in the battery cells 166, as well as maintaining responsiveness and establishing a constant transmit-receive link with the control box 154 (useful other logic, described below). Control signals to the control box 154 are transmitted via a transmitter antenna 186, which is embedded within and concurrently functions as a user wrist strap for the remote controller 150.

The interpreter logic 182 interprets the buttons (168, 170, 172, 174, and 176) in different manners. In this version, the primary power on/off is controlled at the control box 154 by the latching function of the on switch 156 and the off switch 158, and is independent of the remote controller 150. The remote controller 150 is always active and does not require a separate switch, the present design operates off of a single set of battery cells 166 for an entire season. The stop/start button 168, the fast button 174 and the slow button 176 use toggle type switch logic, with activation and deactivation being accomplished by alternate depressions of the button. On the other hand, the left turn button 170 and the right turn button 172 use maintained contact type logic, generated only during the interval in which depression is maintained, so that a continuing turn requires continuous pressure on the associated button.

The interpreter logic 182 also operates the transmit LED 178, to provide feedback to the user. By pressing the stop/start button 168 the transmit LED 178 is caused to blink rapidly for approximately two seconds, and to then blink at a slower rate until the stop/start button 168 is again pressed. Activation of any of the other buttons (168, 170, 172, 174, and 174) similarly produces a rapid blinking during the depressed state and for two seconds thereafter. In this manner a user always has a confirmation when the remote controller 150 is working and active, via the slow blinking, as well as confirmation of ongoing or recent command entry, via rapid the blinking.

The signals generated and transmitted by the remote controller 150 are received via the base spar tube 38, serving an additional role by functioning also as a receiver antenna (in the preferred embodiment it is aluminum alloy, and thus electrically conductive). In the control box 154 a generalized control box circuitry 188 is situated which is used to control the outputs to the drive motor 128 and the steering solenoid 86, thus controlling the motive power (forward motion) and the steering of the cart 10. The control box circuitry 188 is powered by the power battery 66 (possibly with an intermediate voltage adjustment).

The preferred control box circuitry 188 includes receiver logic 190, power distribution logic 192 and steering logic 194. In addition, three control features are critical enough to include separate identification. These are a tether sublogic 196 which is a part of the receiver logic 190, a braking sublogic 198 which is a part of the power distribution logic 192 and a self-centering sublogic 200 which forms a portion of the steering logic 194.

The receiver logic 190 receives radio input from the remote controller 150 and delivers appropriate instructions to either or both of the power distribution logic 192 or the steering logic 194. These portions then respectively control the speed of rotation (including non-rotation) of the drive motor 128 and the degree and direction of extension of the solenoid shaft 114 of the steering solenoid 86. In the cart 10, the power distribution logic 192 and the steering logic 194 both include ramping capability to avoid abrupt status changes.

In the present embodiment, the circuitry 180 of the remote controller 150 and the control box circuitry 188 of the control box 154 operate on five possible broadcast frequencies and use a system of 512 different identification codes, to limit the possibility of anyone other than the actual present user being able to remotely control a target cart 10.

The tether sublogic 196 is used to stop the cart whenever reception of signals from the remote controller 150 is cut off (recall that the remote controller 150 transmits every eighth of a second). One example of this can occur when the cart 10 travels beyond the range of transmission the remote controller 150. Obviously, in such a situation it would be unacceptable for the cart 10 to be allowed to continue operating and to runaway, or to uncontrollably crash into something or someone. Therefore, the function of the tether sublogic 196 is to gracefully stop the cart 10, until reception of signals from the remote controller 150 is reestablished.

The braking sublogic 198 is utilized to prevent other types of cart runaway problems. On down slopes a loaded wheeled device tends to roll without power assistance, which can result in lost control. The braking sublogic 198 is utilized to provide feedback to the drive motor 128 in a manner to act as a dynamically brake and limit rotation of the drive wheel 122 when the rotational velocity starts to exceed that provided by the drive motor 128. The structure of the drive motor 128 and the power train unit 138 together are also such as to provide mechanical resistance to rotation when the power is turned off. However, this resistance is intentionally limited, since it is desired that the user may be able to manually operate the cart 10 with a dead battery, or the like.

The self-centering sublogic 200 keeps the cart 10 traveling along the path of the bisecting plane 18 except when intentionally turned by the user. Thus, the self-centering sublogic 200 provides for a damped return of the front wheels 72 and 74 to align them with the bisecting plane 18 at all times when a turn signal from the remote controller 150 is not being sent. When no power is present, as in the dead battery case, the steering control is free to facilitate manual control.

MATERIALS AND CONSTRUCTION

The powered cart 10 of the present invention is constructed of strong materials in order to withstand substantial usage, since many golfers who would wish a device such as this are on the course several times per month, and in some cases, daily. Lightweight materials are also of great importance, primarily for ease of use and storage, but also for power consumption minimization. For these reasons the primary materials are aluminum for the frame structures and high strength plastics for wheels and the like. The dimensions are selected to conform to the ordinary golf bags found on the marketplace and to fit into standard storage and transport facilities.

In addition to the above mentioned examples, various other modifications and alterations of the dimensions, materials, orientation and usage may be made without departing from the invention. Accordingly, the above disclosure is not to be considered as limiting and the appended claims are to be interpreted as encompassing the entire spirit and scope of the invention.

INDUSTRIAL APPLICABILITY

The powered golf bag cart 10 of the present invention is intended to be utilized by any golfer who does not wish to ride themselves, and thus lose the exercise benefit, during a round of golf, but who wishes to avoid the physical strain of transporting the clubs. The cart 10 is adapted to support and precisely transport a loaded golf bag 12 under precise control from the golfer. It is also adapted to exist in either an expanded use mode or a compact storage mode.

In actual use, the typical golfer will start with the cart 10 in an unloaded store mode (see FIG. 2) in the garage. In preparation for a round of golf, the golfer will load the compact cart 10, the golf bag 12, a freshly charged power battery 66, and one or two remote controllers 150, including battery cells 166 which have sufficient charge to last throughout the round, into the trunk of a car and transport them to a golf course.

Upon arrival and removal of the paraphernalia from the trunk, the golfer will convert the cart 10 to the use mode by unfolding the frame assembly 20. This is accomplished by rotating the central portion 34 out from between the spar tubes (38, 44, and 54) of the base portion 32 until the central portion 34 is substantially vertical (FIG. 1) where it is locked in position using the lower hinge assembly 42. The handle portion 36 is then rotated backward and upward to a desired orientation and secured by the upper hinge assembly 46. Then the power battery 66 is placed on the battery support bracket 64 and electrically connected to the wiring 152. After the golf bag 12 is placed on the cart 10 the golfer is ready to go.

The power system of the cart 10 is activated by pressing the on switch 156. The golfer may then use the remote controller 150, carried separately remote from the cart 10. The radio transmitted control signals are effective to turn the cart 10 in any desired direction by judicious use of the left turn button 170 and the right turn button 172 and to go forward in various speeds, depending on the usage of the stop/start button 168, the fast button 174 and the slow button 176.

Although not as smooth or easy as an unpowered bag cart, the invention is adapted to be operable even without electrical power. The handle portion 36 is configured for gripping and manipulation and the entire structure is balanced in such a way that the golfer will be able to complete the round in the event of power failure or malfunction.

After the round, the golfer reverses the process to return the cart 10 to the store mode, recharges the power battery 66 and is ready to face the course again on another day.

Because of the many convenience features, the durability and ease of use and the adaptability to a wide variety of golf bags and terrain, the powered golf bag cart 10 of the present invention is expected to appeal to a broad variety of users and to have industrial applicability and commercial utility which are both widespread and long lasting.

We claim:

1. A powered golf bag cart for use in conjunction with a golf bag, comprising:

a collapsible frame assembly including a base portion, a central portion, and a handle portion;

a power delivery assembly mounted on said frame assembly;

a drive wheel assembly, depending from said frame assembly and actively coupled with said power delivery assembly so as to be turned thereby;

a free wheel assembly including two opposed free wheels;

a steering assembly for adjusting the orientation of said free wheel assembly with respect to said frame assembly; and user operable control assembly means for controlling said power delivery assembly and said steering assembly, wherein said frame assembly is formed such that it may be folded into a compact storage mode wherein the central portion and the handle portion nest adjacent to the base portion of the frame assembly, and said free wheel assembly is formed such that it may be horizontally folded, and the golf bag cart may be expanded into a use mode wherein the portions of said frame assembly and said free wheel assembly fold outward and are secured in place.

2. The golf bag cart of claim 1 wherein:

the golf bag cart is generally symmetrical about a vertical bisecting plane.

3. The golf bag cart of claim 1 wherein:

said free wheel assembly includes a pair of parallelogram positioners, one associated with each of said free wheels, to permit said free wheels to be disposed outward from said frame assembly during said use mode and folded inward against said frame assembly in said storage mode.

4. The golf bag cart of claim 3 wherein:

said steering assembly includes a steering solenoid having a solenoid shaft including two opposed ends; and each said parallelogram positioner includes a steering rod pivotally connected to one of said opposed ends of said solenoid shaft, to lozengeably move said parallelogram positioner under control of said steering assembly and thereby change orientation of said associated free wheels to steer the golf bag cart.

5. The golf bag cart of claim 1 wherein:

said drive wheel assembly includes a rear drive wheel rotatably mounted on a fork arm depending from said frame assembly; and said power delivery assembly includes a rotary electrical drive motor and a power train assembly for delivering mechanical rotation from said drive motor so as to turn the drive wheel.

6. The golf bag cart of claim 5, wherein:

said drive motor includes dynamic braking capability.

7. The golf bag cart of claim 5, wherein:

said drive motor and said power train assembly provide user overcomable mechanical resistance to rotation, to provide mechanical braking when said drive motor is not operating.

8. The golf bag cart of claim 1 wherein:

said control assembly means includes a control box mounted on the golf bag cart and at least one remote controller capable of communicating with said control box, so that said control assembly may be operated by a user at a remote location from the golf bag cart.

9. The golf bag cart of claim 8 wherein:

said control assembly means includes tether logic means, to automatically bring the golf bag cart to a stop in the event that communications between said remote controller and said control box are interrupted.

10. The golf bag cart of claim 1 wherein:

said drive motor includes dynamic braking capability; and said control assembly means includes braking logic means, to automatically control said dynamic braking capability, and thereby limit the speed of the golf bag cart to that requested by a user.

11. The golf bag cart of claim 4 wherein:

said control assembly means includes self-centering logic means, to automatically control said steering assembly to orient said free wheels so that the golf bag cart travels in a straight path, unless a user is using said control assembly to turn the golf bag cart in another direction.

12. A powered cart for use with a golf bag, comprising:

a frame assembly upon which a golf bag may be supported;

a three-wheeled rolling support structure including a pair of unpowered front wheels disposed outward from said frame assembly and a powered rear wheel disposed under the center of a rear portion of said frame assembly, wherein said rear wheel is mounted in a fixed fashion and said front wheels are mounted on horizontally folding structures such that they may be folded against said frame member during periods of nonuse, but extended horizontally outward therefrom during use periods; and a user operated steering assembly including a steering solenoid and steering arms connected to each said front wheel, for providing power assisted steering using said front wheels.

13. The golf bag cart of claim 12 wherein:

power for said rear wheel is provided by a rotary drive motor mounted on said frame assembly and a power t rain assembly for transferring power from said drive motor to said rear wheel, said drive motor being driven by a portable power source mounted on said frame member and controlled by control means which may be attached to said frame assembly but are not restricted thereto; and said control assembly means also controls the manner in which the golf bag cart is steered.

\* \* \* \* \*